United States Patent
Yamakawa (10) Patent No.: US 8,452,102 B2
(45) Date of Patent: May 28, 2013

(54) IMAGE MANAGEMENT APPARATUS, CONTROL METHOD, AND STORAGE MEDIUM

(75) Inventor: Kanako Yamakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 12/711,075

(22) Filed: Feb. 23, 2010

(65) Prior Publication Data

US 2010/0232702 A1    Sep. 16, 2010

(30) Foreign Application Priority Data

Mar. 16, 2009  (JP) .................................. 2009-063418
Jan. 15, 2010  (JP) .................................. 2010-007197

(51) Int. Cl.
    *G06K 9/46* (2006.01)
(52) U.S. Cl.
    USPC ........... 382/190; 382/192; 382/101; 382/103; 382/118; 382/181; 382/195; 382/124; 348/169; 348/154; 348/170; 348/700
(58) Field of Classification Search
    CPC ............... H04N 5/232; H04N 5/23219; H04N 21/21805; H04N 21/44008; H04N 5/147; H04N 5/23206; H04N 5/23212; H04N 5/23296; H04N 7/181; H04N 7/26638; H04N 7/366; H04N 7/368
    USPC ................. 382/190, 192, 101, 103, 118, 181, 382/195, 124; 348/169, 154, 170, 700
    See application file for complete search history.

(56) References Cited

U.S. PATENT DOCUMENTS

| | | | |
|---|---|---|---|
| 7,809,196 B2 * | 10/2010 | Watanabe et al. ............. | 382/195 |
| 2007/0274592 A1 * | 11/2007 | Matsuhira ...................... | 382/190 |
| 2007/0283031 A1 * | 12/2007 | Yoshida ......................... | 709/230 |

FOREIGN PATENT DOCUMENTS

| | | |
|---|---|---|
| JP | 2007-295289 A | 11/2007 |
| JP | 2007-325096 A | 12/2007 |

* cited by examiner

*Primary Examiner* — Mike Rahmjoo
(74) *Attorney, Agent, or Firm* — Canon USA Inc IP Division

(57) ABSTRACT

The present invention is directed to an image managing apparatus allowing a user to acquire an image shot by other user participated in an event that the user participated in when a user shot images with the user's own camera but there was a period of time in which the user could not shoot due to some reason. The image management apparatus of the present invention is configured to sort a plurality of images shot by the user's camera based on a shooting time, calculate a non-shooting time period, extract an image shot by a camera of other user, which has a shooting time included in the non-shooting time period of the user. Further, the image management apparatus extracts an image having keywords, a shooting position, and object information, which are the same as an image shot by the camera of the user.

11 Claims, 13 Drawing Sheets

STILL IMAGE DATA

| PHOTOGRAPHIC INFORMATION | ~201 |
| REDUCED IMAGE INFORMATION | ~202 |
| IMAGE INFORMATION | ~203 |

FIG.2B

MOVING IMAGE DATA

| PHOTOGRAPHIC INFORMATION | ~231 |
| IMAGE INFORMATION | ~233 |

IMAGE MANAGEMENT APPARATUS, CONTROL METHOD, AND STORAGE MEDIUM

BACKGROUND OF THE INVENTION

1. Field of the Invention

The present invention relates to a technique for managing an image related to shooting time and identification information.

2. Description of the Related Art

Because of rapid spread of a large capacity memory of a recording medium and web systems, there have been many cases in which an individual must manage a large amount of images. Further, image shooting apparatuses such as a digital camera and a digital video camera have been reduced in size and weight, and therefore, are widely used because of its portability. As a result, opportunities that a plurality of photographers exchange images shot with their own image shooting apparatus, and manage them have been increased.

Further, there is a case where a photographer can not temporarily shoot an image since a battery of a camera is exhausted during shooting, the photographer changes a recording medium of the camera, or the photographer is absent due to some reasons. In that case, the photographer may acquire images shot with a shooting apparatus of other photographer who participated in the event while the photographer could not shoot.

However, since it requires great care, and it is difficult for a photographer to extract an image shot by other image shooting apparatus while the photographer could not shoot with a photographer's own image shooting apparatus.

SUMMARY OF THE INVENTION

The present invention is directed to an image management apparatus and a control method therefore capable of easily extracting an image shot with other image shooting apparatus while a photographer could not shoot with a the photographer's own image shooting apparatus.

According to an aspect of the present invention, an image management apparatus configured to manage an image related to a shooting time and identification information of an image shooting apparatus. The apparatus includes an acquisition unit configured to sort a plurality of images related to first identification information based on a shooting time, and acquire a time interval of shooting times of adjacent images. The apparatus further includes an extraction unit configured to extract an image related to a shooting time included in a time period in which the time interval longer than a predetermined length, from a plurality of images related to second identification information which is different from the first identification information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In the following exemplary embodiments of the present invention, a configuration and an operation of the image management apparatus of the present invention will be described using examples in which a personal computer (PC) is used as an image management apparatus having functions for managing images stored in a hard disk and images stored in an external recording apparatus.

Figure 1:
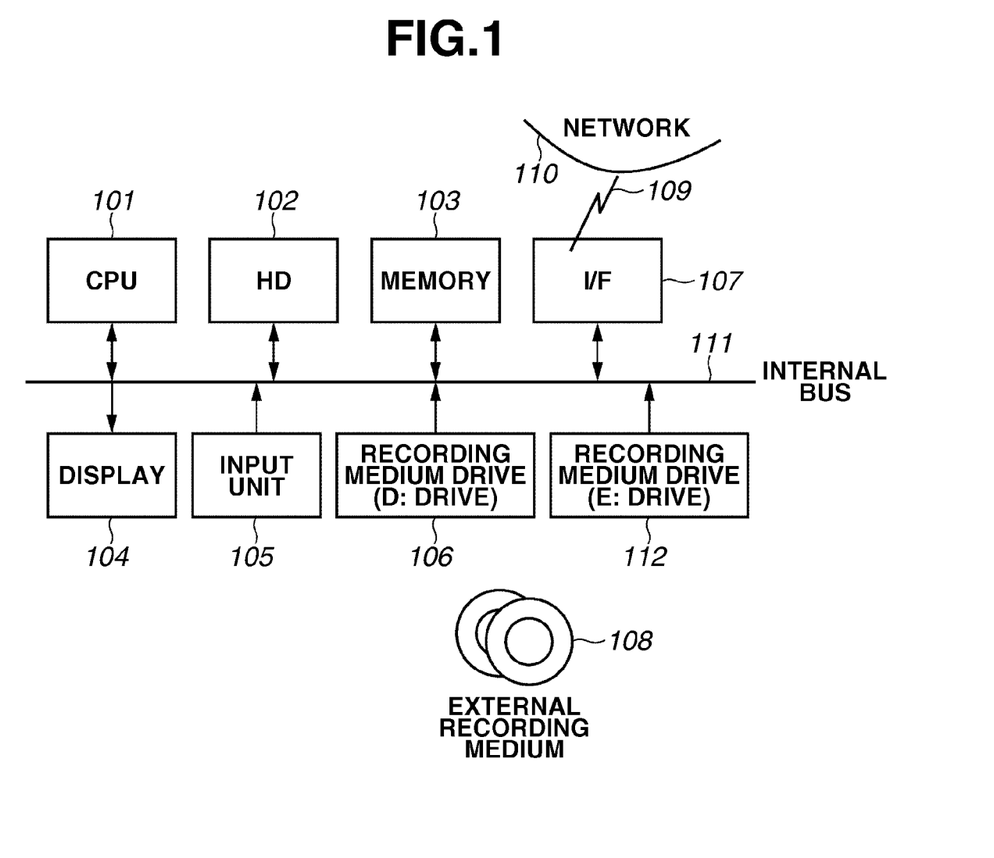
FIG. 1 is a block diagram illustrating an example of a configuration of a personal computer (PC) functioning as an image management apparatus according to an exemplary embodiment of the present invention.

FIG. 1 is a block diagram illustrating a configuration of a PC functioning as an image management apparatus according to the present exemplary embodiment. A central processing unit (CPU) 101 controls an operation of an entire image management apparatus. A hard disk (HD) 102 stores programs and digital data such as an image.

An image management program is stored in the HD 102 as a readable program code, and CPU 101 reads from the HD 102 and executes the program.

A main memory 103 is used as a work area of the CPU 101. A display 104 displays characters and images. An input unit 105 includes a keyboard and a mouse. The input unit 105 can be an input device other than the keyboard and the mouse. A user uses the input unit 105 to operate the image management apparatus and input various kinds of information.

Recording medium drives 106 and 112 read data stored in an external recording medium 108 such as a compact disc-read only memory (CD-ROM), a digital versatile disc-read only memory (DVD-ROM), and a memory card, or writes data in the external recording medium 108. In the present exemplary embodiment, the external recording medium 108 is a memory card, and there are two recording medium drives, i.e., a D:Drive 106 and an E:Drive 112.

In addition, the image management apparatus may have any other number of the recording medium drives. The external recording medium 108 can be an external recording medium such as CD-ROM or DVD-ROM other than the memory card. In the present exemplary embodiment, an example in which a program is recorded in the HD 102 is described. However, the program may be recorded in the external recording medium 108 and the CPU 101 may execute the program using the D:Drive 106 and the E:Drive 112.

A network interface 107 is connected with a network 110 via a communication line 109. The present invention can be applied when a recording medium exists on the network 110 and the program is executed on the recording medium, or when the processing target image data exists in a recording medium on the network 110. An internal bus 111 is used to connect above-mentioned units.

Figure 2A:
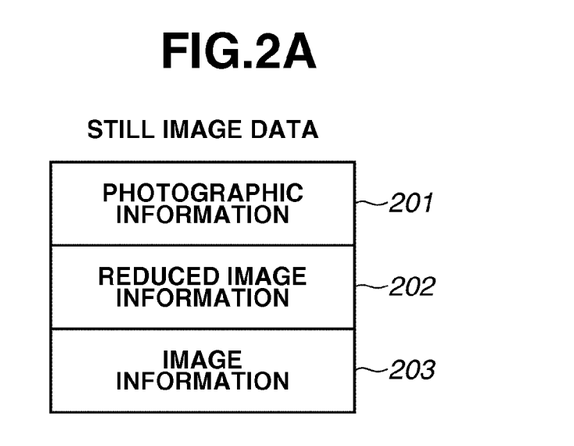
FIGS. 2A and 2B illustrate an example of configurations of image files according to an exemplary embodiment of the present invention.

FIGS. 2A and 2B respectively illustrate configurations of a still image file and a moving image file of the present exemplary embodiment. As illustrated in FIG. 2A, the still image file includes photographic information 201 representing shooting conditions at a time of shooting, reduced image information 202 storing thumbnail image data of a shot image, and image information 203 storing shot image data main body.

Figure 2B:
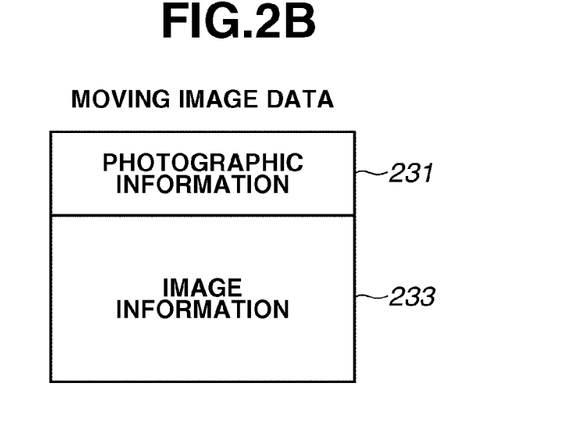

The photographic information 201 includes a model name, shooting position information, and owner information of an image shooting apparatus for uniquely identifying a shooting time, a keyword, and an image shooting apparatus. As illustrated in FIG. 2B, the moving image file includes photographic information 231 and image information 233. The photographic information 231 represents shooting conditions at a time of shooting, such as a model name, shooting position information, and owner information of an image shooting apparatus, for uniquely identifying a shooting time, a keyword, and an image shooting apparatus. The image information 233 stores a shooting image data main body.

Figure 3:
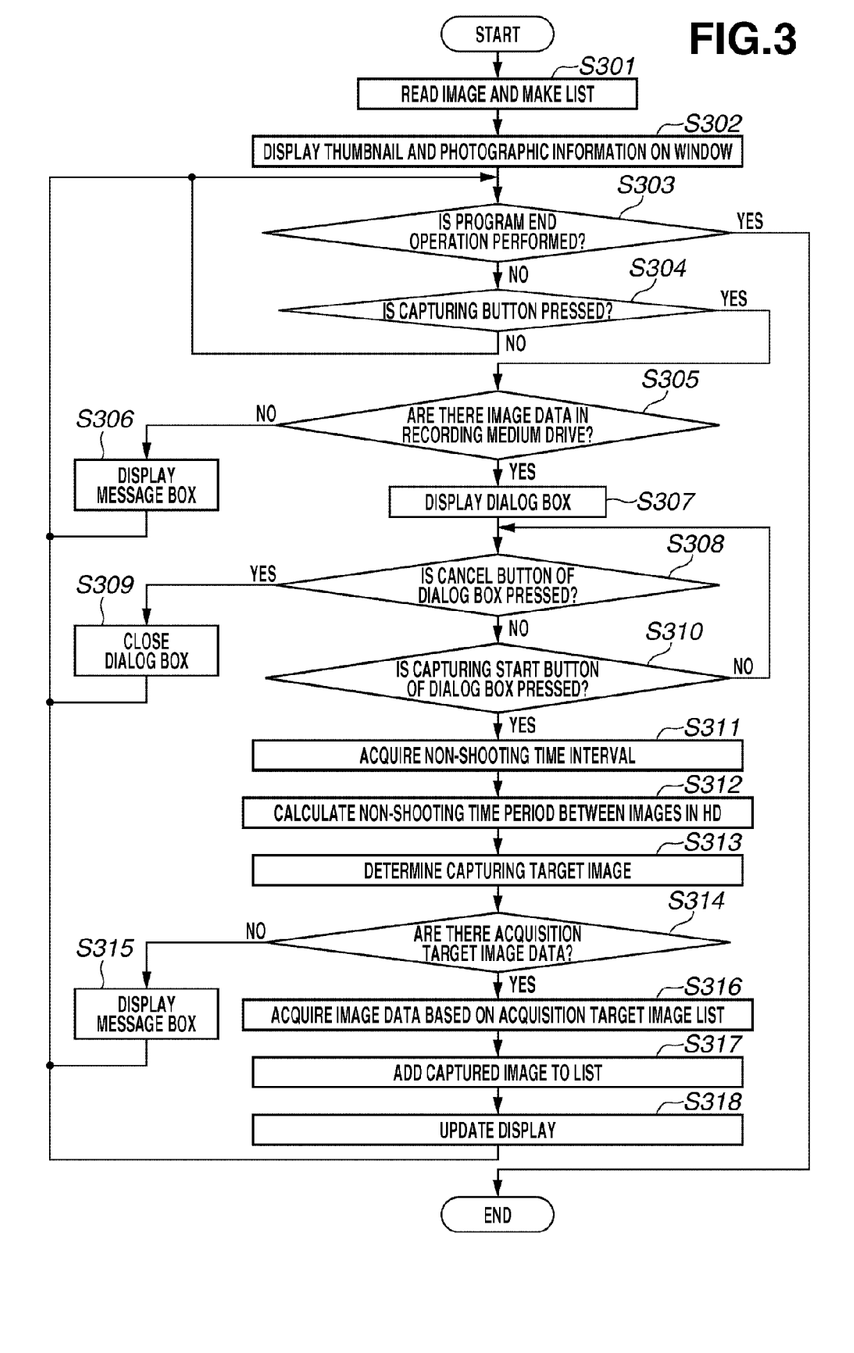
FIG. 3 is a flowchart illustrating an example of an operation of an image management apparatus according to an exemplary embodiment of the present invention.

An operation of an image management apparatus according to the present exemplary embodiment will be described with reference to the flowchart in FIG. 3. The operation is performed when the CPU 101 of the image management apparatus reads an image management program from the HD 102 and starts executing the program.

Figure 4A:
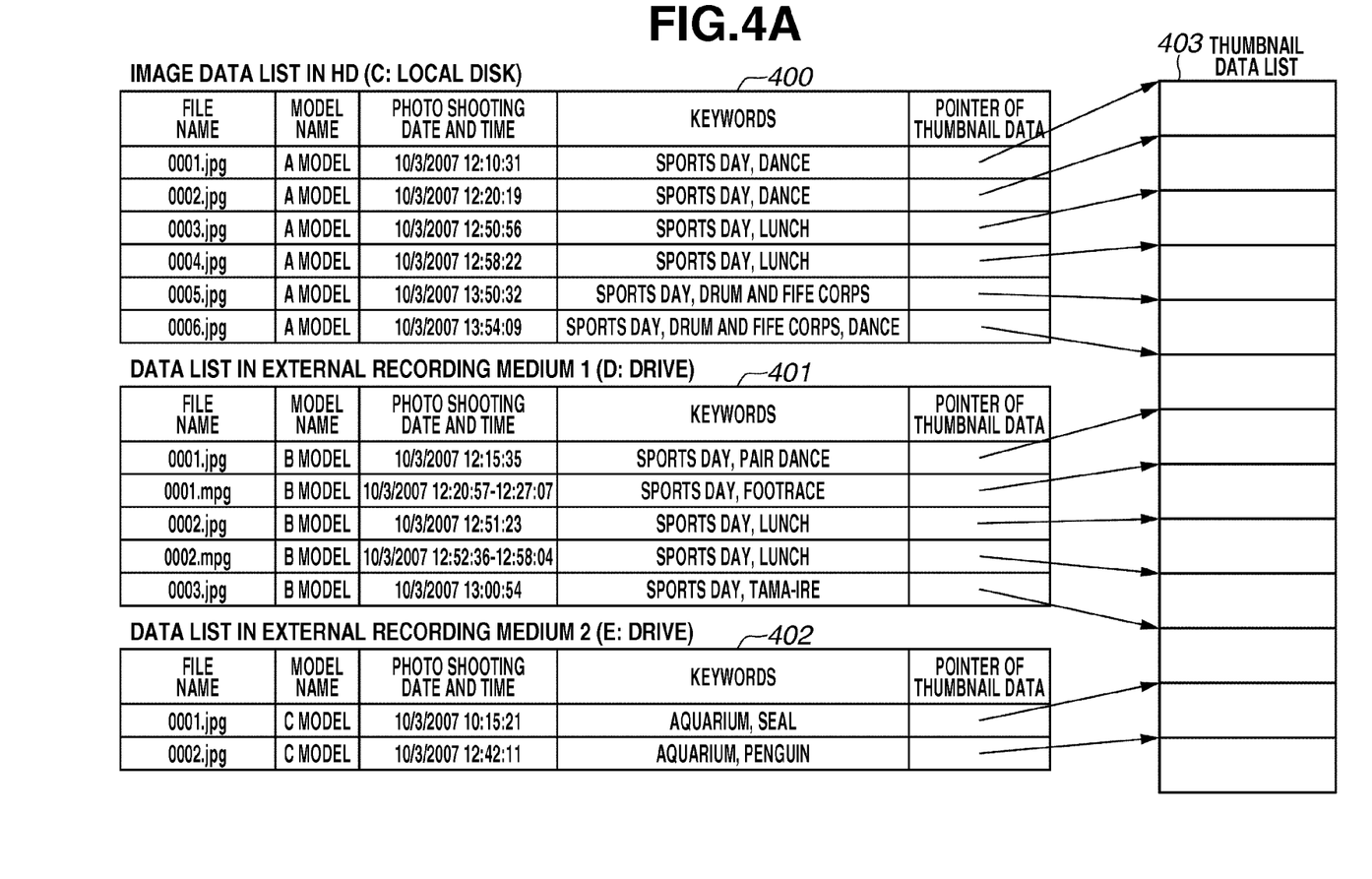
FIGS. 4A and 4B illustrate an example of image lists and a thumbnail list according to an exemplary embodiment of the present invention.

In step S301, the CPU 101 reads an image file from the HD 102 or the external recording medium 108, creates image lists 400 to 402 illustrated in FIG. 4A and a thumbnail list 403, and stores these lists in a memory 103.

Figure 4B:
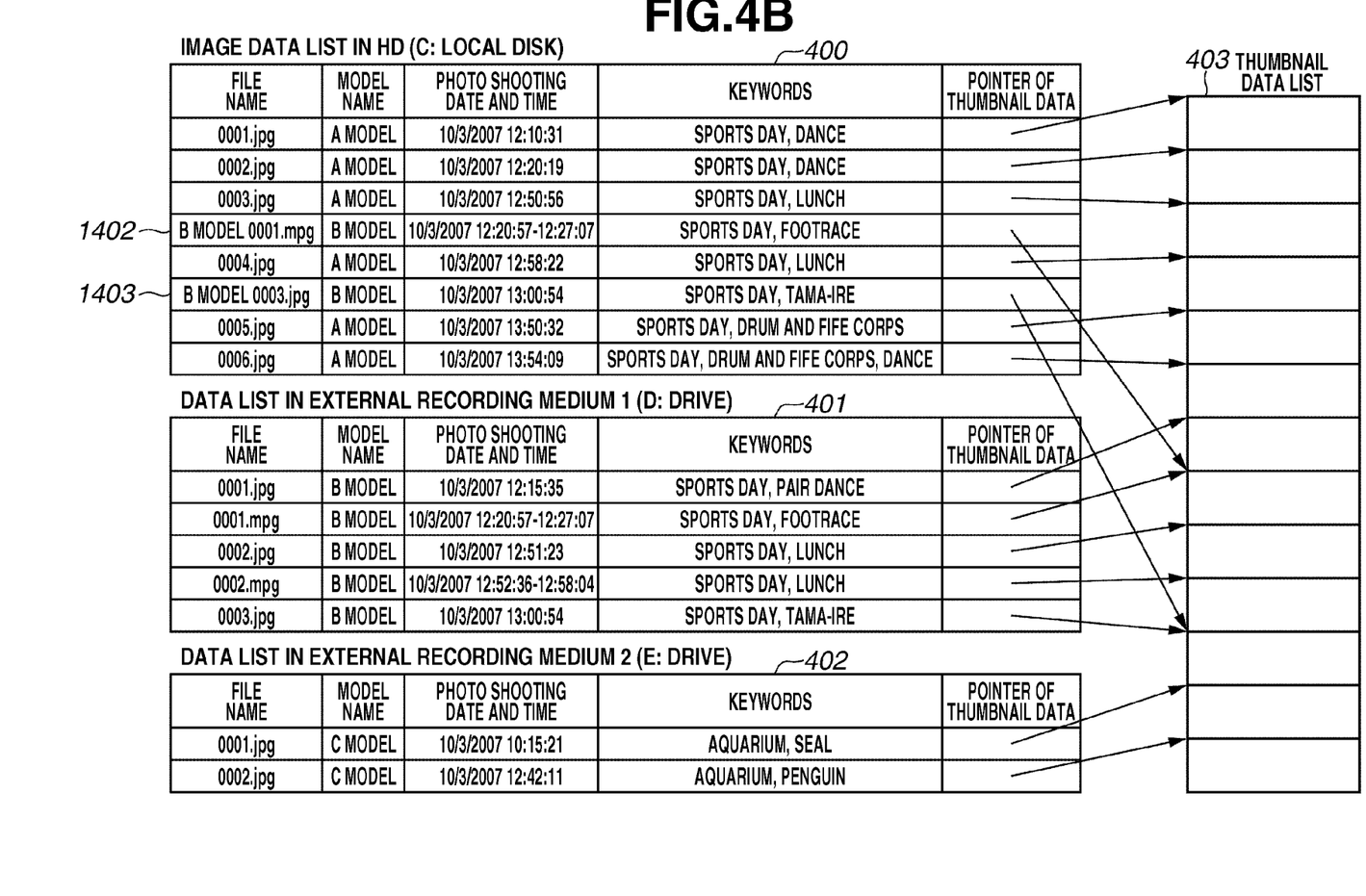

As illustrated in FIGS. 4A and 4B, the image lists 400 to 402 include a file name, a model name of an image shooting apparatus, a shooting time, a keyword, a pointer of a thumbnail image. The image list 400 is a list of image files stored in the HD 102. The image lists 401 and 402 are lists of image files, which are respectively readable from the external recording medium 108 by the D:Drive 106 and the E:Drive 112. In each image list 400 to 402, image files are sorted time-sequentially based on the shooting time.

Moving image files are sorted by using a shooting start time as a shooting time. A thumbnail image stored in the thumbnail list 403 is reduced image information 202 for a still image file, and a leading frame of the image information 233 for a moving image file.

In addition, when a thumbnail image is previously associated with the moving image file and stored, the thumbnail image can be used. FIG. 4A illustrates a state before an image capturing processing, and FIG. 4B illustrates a state after the image capturing processing.

Figure 5:
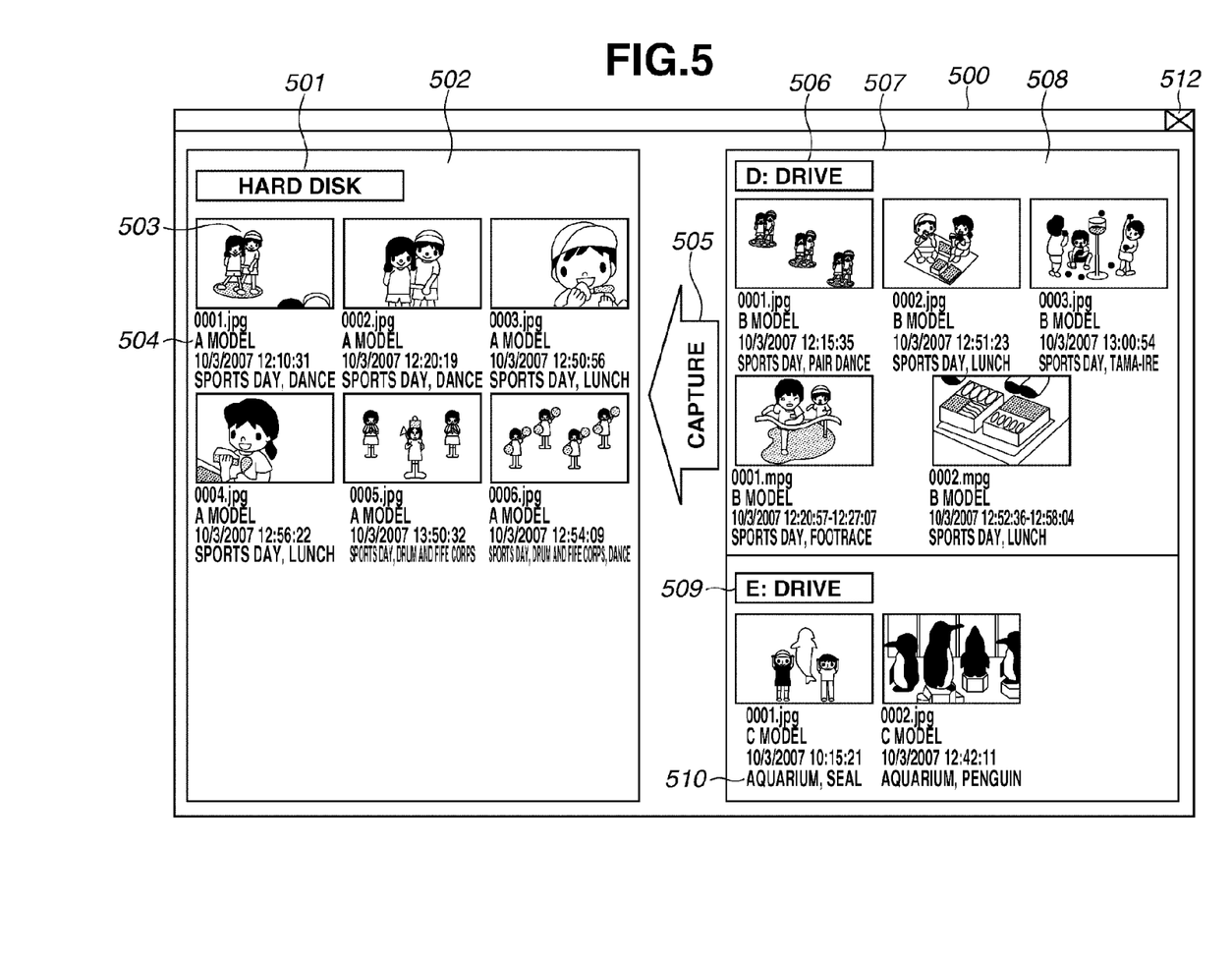
FIG. 5 illustrates an example of an image capturing window before capturing images according to an exemplary embodiment of the present invention.

In step S302, the CPU 101 displays an image capturing window 500 illustrated in FIG. 5 on a display 104. On the image capturing window 500, a list of photographic information 504 of the image lists 400 to 402 illustrated in FIG. 4A and a list of a thumbnail image 503 of the thumbnail list 403 are displayed in a display area for each recording medium.

In the present exemplary embodiment, the photographic information 504 includes a file name, a model name, a shooting time, and keywords, which are acquired from the image data. However, the photographic information 504 can include any other information.

On a display area 502 on the left side of the image capturing window 500, images of the image list 400 in the HD 102 are displayed. A display area 507 on the right side of the image capturing window 500 is divided for each recording medium drive. The images in the image list 401 in the D:Drive 106 are displayed in a display area 508. The images in the image list 402 in the E:Drive 112 are displayed in a display area 510.

In each display area, recording medium drive names 501, 506, and 509 are also displayed. Further, between the display area 502 and the display area 507, a capturing button 505 is displayed. The capturing button 505 instructs the CPU 101 to capture images stored in the external recording medium 108 to the HD 102.

In step S303, the CPU 101 determines whether an instruction to end the image management program is performed, in other words, whether a user presses a window closing button 512 of the window 500. If a user presses the window closing button 512 (YES in step S303), the CPU 101 ends the image management program. If a user does not press the window closing button 512 (NO in step S303), the processing to step S304.

In step S304, the CPU 101 determines whether an image capturing instruction is performed, in other words, whether a user presses the capturing button 505 of the image capturing window 500. If a user presses the capturing button 505 (YES in step S304), the processing to step S305. If a user does not press the capturing button 505 (NO in step S304), the processing to step S303.

In step S305, the CPU 101 determines whether there are image files in the external recording medium 108 inserted into the D:Drive 106 or the E:Drive 112, in other words, whether at least one image file is registered in the image lists 401 and 402. If there are image files in the external recording medium 108 (YES in step S305), the processing to step S307.

If there are not image files in the external recording medium 108 (NO in step S305), in step S306, the CPU 101 displays a message box showing, for example, a character string "THERE ARE NOT IMAGE DATA TO BE ACQUIRED". Then, the processing proceeds to step S303.

Figure 7:
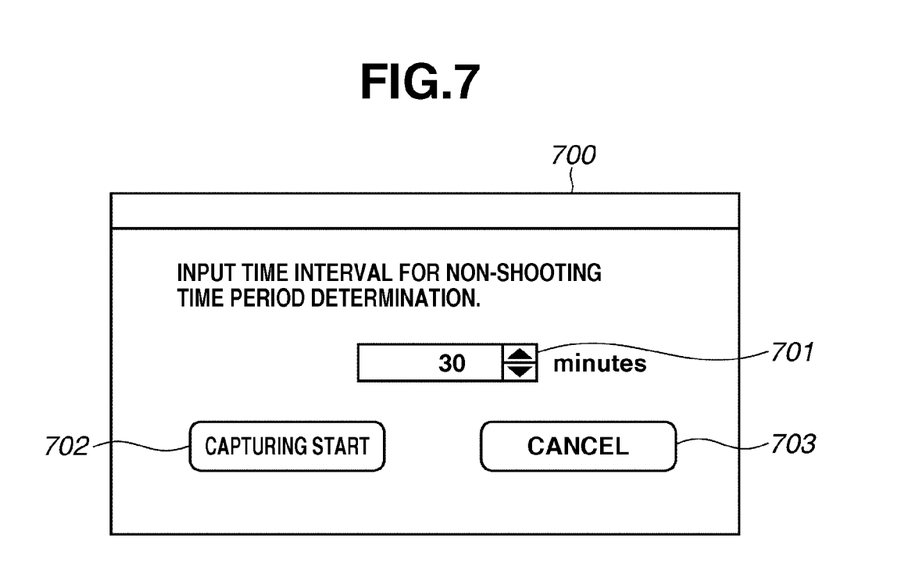
FIG. 7 illustrates an example of a capturing instruction dialog according to an exemplary embodiment of the present invention.

In step S307, the CPU 101 displays a capturing instruction dialog box 700 illustrated in FIG. 7. The capturing instruction dialog box 700 is for inputting a time interval used for non-shooting time period determination and a capturing instruction of an image by a user operation.

In the capturing instruction dialog box 700, an up/down control 701, a capturing start button 702, and a cancel button 703 are arranged. The up/down control 701 is used for inputting a time interval used for non-shooting time period determination.

In the present exemplary embodiment, an example that a user can arbitrarily input a time interval used for non-shooting time period determination is described. However, a fixed time interval may be previously set in the HD 102, and the fixed time interval may be used.

In step S308, the CPU 101 determines whether the cancel button 703 is pressed by a user operation. If the cancel button 703 is pressed (YES in step S308), the processing proceeds to step S309.

If the cancel button 703 is not pressed (NO in step S308), the processing proceeds to step S310. In step S309, the CPU 101 closes the dialog box 700, and the processing proceeds to step S303.

In step S310, the CPU 101 determines whether the capturing start button 702 is pressed by a user operation. If the capturing start button 702 is pressed (YES in step S310), the processing proceeds to step S311. If the capturing start button 702 is not pressed (NO in step S310), the processing proceeds to step S308.

In step S311, the CPU 101 acquires a time interval used for non-shooting time determination, which is set in the up/down control 701 by a user operation. Then, the CPU 101 closes the dialog box 700, and brings it into non-display state.

In step S312, the CPU 101 calculates a non-shooting time period of an image in the HD 102. More specifically, the CPU 101 time-sequentially sorts images recorded in the image list 400, calculates a time period, as a non-shooting time period, in which a time interval between shooting times of adjacent images is longer than the time interval for the non-shooting time determination acquired in step S311.

For example, in the image list 400 in FIG. 4A, the time interval between 0001.jpg and 0002.jpg is 9 minutes and 48 seconds. The time interval between 0002.jpg and 0003.jpg is 30 minutes and 37 seconds. The time interval between 0003.jpg and 0004.jpg is 7 minutes and 26 seconds. The time interval between 0004.jpg and 0005.jpg is 52 minutes and 10 seconds. The time interval between 0005.jpg and 0006.jpg is 3 minutes and 37 seconds.

Therefore, when a time interval used for the non-shooting time period determination is 30 minutes, the CPU 101 determines that a photographer having an image shooting apparatus of the "A" model did not shoot between shooting of the 0002.jpg and shooting of the 0003.jpg, and did not shoot between shooting of the 0004.jpg and shooting of the 0005.jpg. Accordingly, the CPU 101 calculates a time period from Oct. 3, 2007 12:20:19 to Oct. 3, 2007 12:50:56 and a time period from Oct. 3, 2007 12:58:22 to Oct. 3, 2007 13:50:32, as a non-shooting time period.

In the present exemplary embodiment, all of the model names for the image files in the HD 102 are the "A" model. However, when the HD 102 includes image files having other model names, the CPU 101 calculates the non-shooting time period for each model names. In addition, the CPU 101 may calculate also the time period of the time interval for the non-shooting time determination from a shooting time of an image at a head or a tail in the image list 400, as a non-shooting time period.

In step S313, the CPU 101 determines capturing target images to be copied from the D:Drive 106 or the E:Drive 112 to the HD 102, based on the non-shooting time period calculated in step S312 and the photographic information of image files.

In the present exemplary embodiment, images satisfying all of the following three conditions can be a capturing target image.

The first condition is that the image has a model name of an image shooting apparatus different from the model name of an image in the HD 102. That is, in the present exemplary embodiment, the model names of images in the image list 400 are only "A" model. Thus, an image having a model name other than "A" model represents the first condition.

The second condition is that a shooting time is included in the non-shooting time period. In a case of a moving image, even if a part of a shooting time overlaps the non-shooting time period, the moving image satisfies the second condition. In the present exemplary embodiment, "0001.mpg" and "0003.jpg" in the image list 401 and "0002.jpg" in the image list 402 satisfies the second condition.

The third condition is that an image has at least one keyword in the keywords, which the images in the HD 102 have. The images in the image list 400 in the present exemplary embodiment have four keywords "SPORTS DAY","DANCE","LUNCH", and "DRUM AND FIFE CORPS". All of the images in the image list 401 have the keyword "SPORTS DAY". Thus, the images in the image list 401 satisfies the third condition.

On the other hand, the images in the image list 402 do not satisfy the third condition because of not having the same keywords at all.

Accordingly, the images satisfying all of the three conditions are "0001.mpg" and "0003.jpg" in the image list 401, and these two images come to be the capturing target image data. In addition, when each image has a shooting place, the third condition can be changed so that each image has the same shooting place.

In step S314, the CPU 101 determines whether there are capturing target images. If there are capturing target images (YRS in step S314), the processing proceeds to step S316.

If there are not the capturing target images (NO in step S314), the processing proceeds to step S315. In step S315, the CPU 101 displays, for example, a character string "THERE ARE NO CAPTURING TARGET IMAGES." in a message box. Then, the processing proceeds to step S303.

In step S316, the CPU 101 captures the capturing target images, i.e., 0001.mpg and 0003.jpg in the D:Drive 106, to the HD 102 by copying. At this time, the file name of the image to be copied is changed to be "an image shooting apparatus model name and an original file name".

If the file name of an image to be copied competes with a file name of an image presently stored in the HD 102, overwriting can be prevented by, for example, adding a serial number to the file name of an image to be copied.

In step S317, the CPU 101 updates the image list 400 by adding information of the image copied to the HD 102 in step S316. FIG. 4B illustrates a state that information 412 and 413 of copied images are added to the image list 400.

Figure 6:
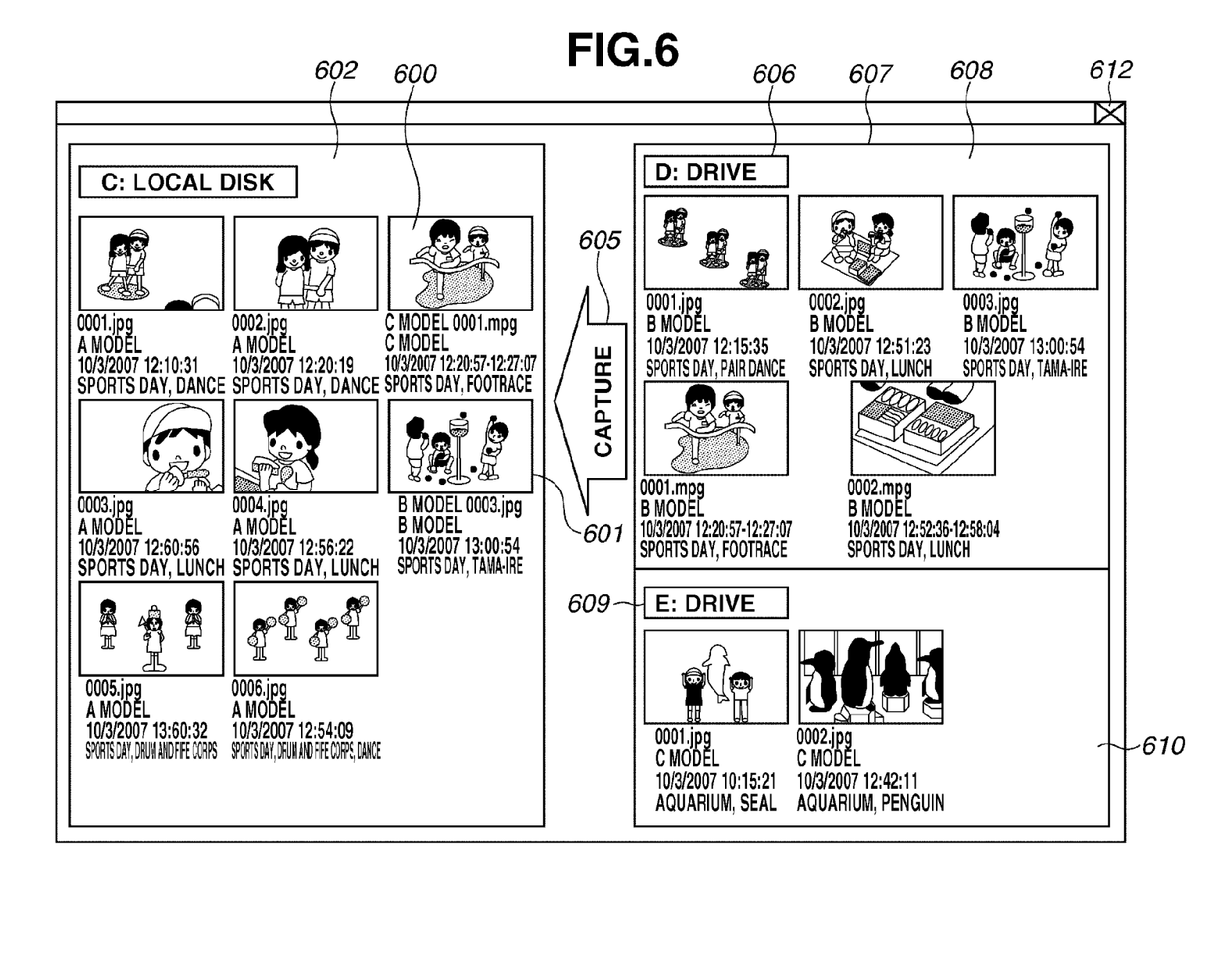
FIG. 6 illustrates an example of an image capturing window after capturing images according to an exemplary embodiment of the present invention.

In step S318, based on the image list 400 updated in step S317, the CPU 101 displays the image data acquired in step S315 in the display area 502 of the image capturing window 500. FIG. 6 illustrates a state where an image 600 acquired by coping the 0001.mpg in the D:Drive 106 and an image 601 acquired by coping the 0003.jpg in the D:Drive 106 are displayed. Then, the processing proceeds to step S303.

According to the present exemplary embodiment, when the calculation of the non-shooting time period is determined, the CPU 101 can easily determine a time period in which the first image shooting apparatus did not shoot by using the image shooting apparatus model name. Further, according to the first and second image capturing conditions, the CPU 101 can easily extract an image shot by the second image shooting apparatus, which is different from the first image shooting apparatus, while the first image shooting apparatus could not shoot.

According to the third image capturing condition, the CPU 101 can extract an image of an event in which the user having the first image shooting apparatus participated, and prevent to extract an image, which other image shooting apparatus has shot in a different event at the same time period.

In the present exemplary embodiment, keywords are used as the third condition. However, any other attribute information can be used. For example, position information indicating a shooting place, or information of a object identified by object recognition can be used.

By using the position information, an image shot at a place of an event where a user of the first image shooting apparatus participated can be easily extracted. Further, by using face information, an image in which a person that a user of the first image shooting apparatus wanted to shoot and an image in which participants of the event in which the user of the first image shooting apparatus participated can be easily extracted.

The second exemplary embodiment will be described below. Units similar to the units of the first exemplary embodiment will not be described, and a particular configuration of the second exemplary embodiment will be described in detail.

In the first exemplary embodiment described above, the time period in which the interval of shooting times of images is longer than the time interval set by a user is determined to be the non-shooting time period. On the other hand, in the second exemplary embodiment, a range of shooting time is divided in unit times, and a time period in which there are no images shot in the unit time period is determined to be the non-shooting time period.

In the present exemplary embodiment, the CPU 101 searches a capturing target image according to a priority stored relating to an image shooting apparatus model name.

An operation of the image management apparatus according to the present exemplary embodiment will be described with reference to the flowchart of FIG. 3.

Figure 8:
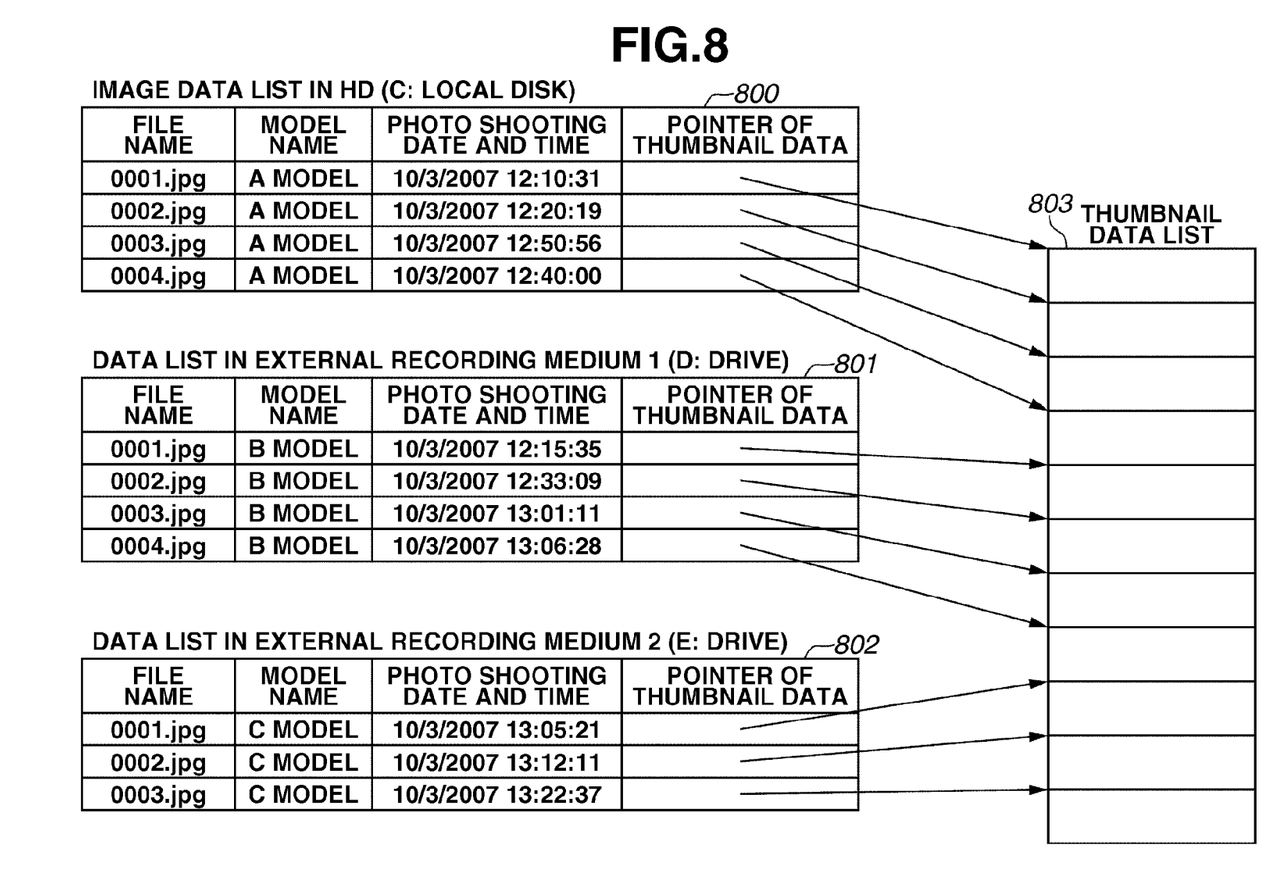
FIG. 8 illustrates an example of image lists and a thumbnail list of an image management apparatus according to an exemplary embodiment of the present invention.

In step S301, the CPU 101 creates image lists 800 to 802 and a thumbnail list 803 illustrated in FIG. 8, and stores them in the memory 103.

As illustrated in FIG. 8, the image lists 800 to 802 include file names, model names of an image shooting apparatus, shooting times, and pointers of a thumbnail image. The image list 800 is a list of image files stored in the HD 102.

The image lists 801 and 802 are lists of image files readable from the external recording medium 108 by the D:Drive 106 and the E:Drive 112. In each of the image list 800 to 802, image files are sorted time-sequentially based on a shooting time. Moving image files are sorted by using a shooting start time as a shooting time.

The thumbnail image stored in the thumbnail list 803 is a reduced image information 202 when the thumbnail image is the still image file, and is a leading frame of the image information 233 when the thumbnail image is the moving image file.

In addition, when a thumbnail image is previously associated with the moving image file and stored, the thumbnail image can be used. FIG. 8 illustrates a state before an image capturing processing.

Figure 9:
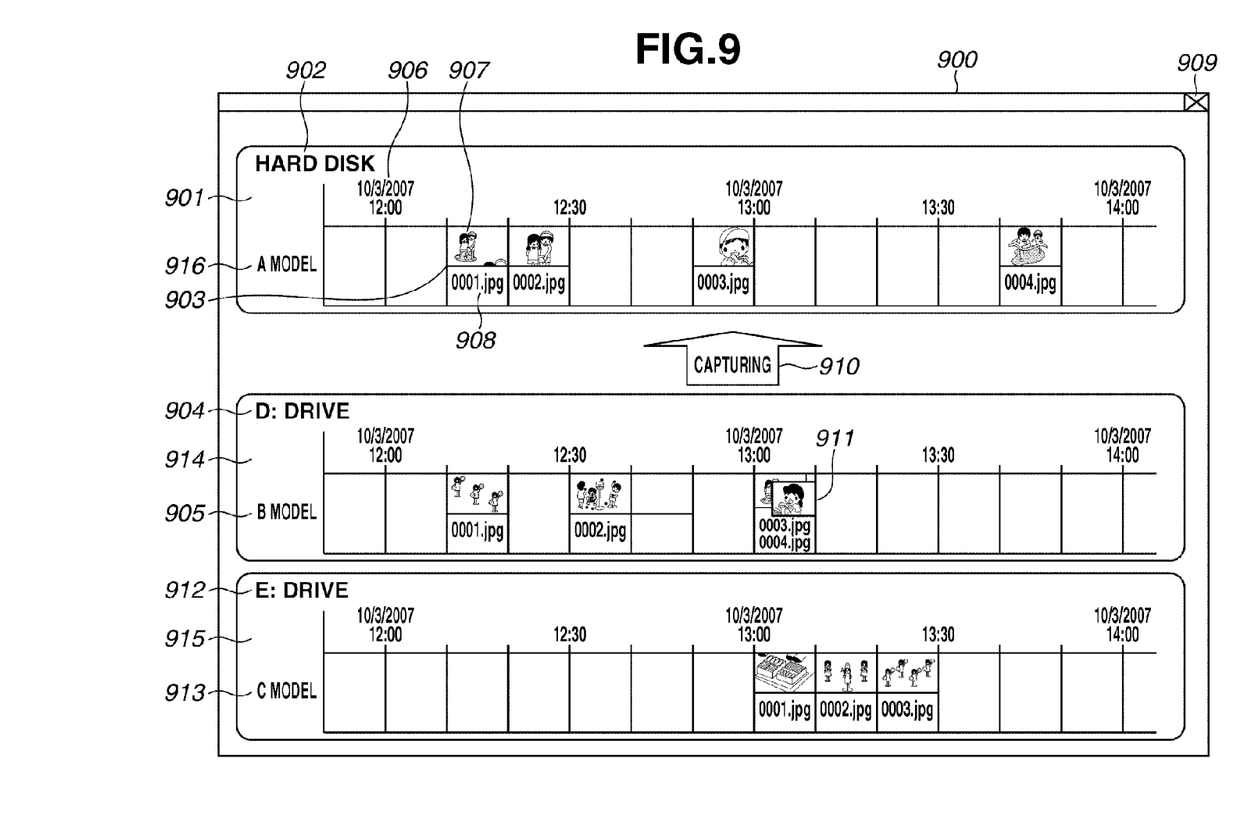
FIG. 9 illustrates an example of an image capturing window before capturing images according to an exemplary embodiment of the present invention.

In step S302 of the present exemplary embodiment, the CPU 101 displays an image capturing window 900 illustrated in FIG. 9 on the display 104. In FIG. 9, images in the image list 800 in the HD 102 are displayed on the display area 901 on the upper side of the image capturing window 900.

A display area on the lower side of the image capturing window 900 is divided for each recording medium drive. Images in the image list 801 in the D:Drive 106 are displayed on a display area 914, and images in the image list 802 in the E:Drive 112 are displayed on a display area 915. In addition, recording medium drive names 902, 904 and 912 are displayed on each display area.

Each display area 901, 914, and 915 is further divided for each image shooting apparatus model name of an image. In the present exemplary embodiment, since each recording medium stores only images of the A model, the B model, and the C model respectively, each display area 901, 914, and 915 is not divided.

In each display area 901, 914, and 915, a thumbnail image 907 and a file name 908 are displayed in a cell 903 that is divided in unit times. In the present exemplary embodiment, a time axis is divided in a unit of 10 minutes and, in each time period, images shot in the time period are displayed.

For example, since the shooting time of the 0001.jpg in the image list 800 is Oct. 3, 2007 12:10:31, the thumbnail image and file name of the 0001.jpg are displayed in the cell 903 having time period from Oct. 3, 2007 12:10 to Oct. 3, 2007 12:20. If there are a plurality of images in a same drive having a same model name, and shot in the same unit time, the thumbnail images are further reduced and displayed in the same cell.

In the present exemplary embodiment, the unit time is 10 minutes. However, the unit time is not limited to 10 minutes. An arbitrary unit time can be determined by a user operation, or a fixed unit time can be previously stored in the HD 102 and read to be used.

A capturing button 910 is displayed between the display area 901 and the display area 914. The capturing button 910 is used for instructing to capture an image stored in the external recording medium 108 to the HD 102.

Figure 11:
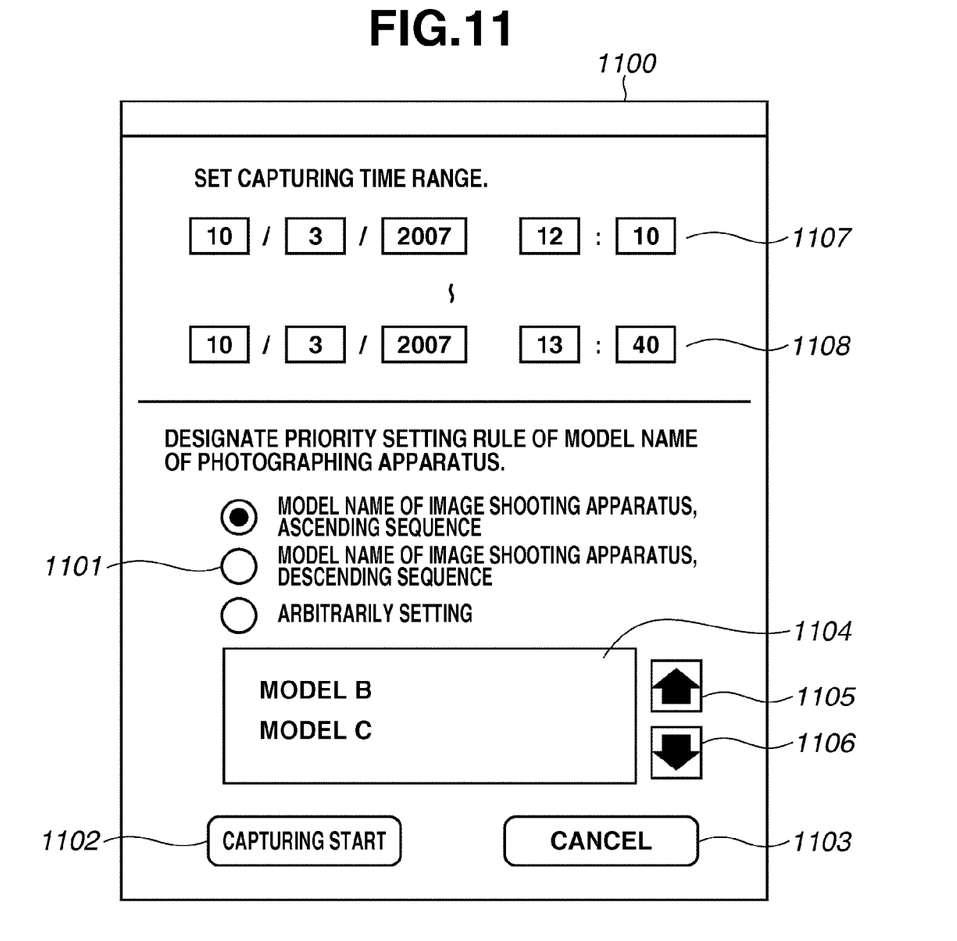
FIG. 11 illustrates an example of a capturing instruction dialog according to an exemplary embodiment of the present invention.

In step S307 of the present exemplary embodiment, the CPU 101 displays a capturing instruction dialog box 1100 illustrated in FIG. 11. The capturing instruction dialog box 1100 is used for inputting a capturing instruction of a range of shooting time and an image to be a capturing target by a user operation. The capturing instruction dialog box 1100 includes each input control.

Text boxes in strings 1107 and 1108 displayed at an upper part of the dialog box 1100 are used to set a time range to be a target for calculating a non-shooting time period (a capturing time range). As for an initial value, the oldest shooting time of an image among images in the HD 102 is set in a string 1107, and the newest shooting time of an image is set in a string 1108 respectively.

A radio button 1101 displayed at a lower part of the capturing instruction dialog box 1100 is used for designating a priority of the image shooting apparatus model name. The priority will be described in detail below. In a list box 1104, model names different from the images in the HD 102 are displayed in ascending order or descending order of the priority. The model names are re-sorted and displayed whenever the radio box 1101 is selected.

An upper button 1105 and a lower button 1106 can be operated only when the radio button 1101 is set to "ARBITRARY SETTING". When a user selects the model name displayed in the list box 1104 and presses the upper button 1105, the order of the priority of the selected model name goes up by one.

On the other hand, when a user presses the lower button 1106, the order of the priority of the selected model name falls by one. Accordingly, a user can freely set the priority of the model name.

In step S310 of the present exemplary embodiment, the CPU 101 acquires the capturing time range and the priority of the model name, which are set in the capturing instruction dialog box 1100. Then, the CPU 101 closes the dialog box 1100, and brings it to non-display state.

In step S312 of the present exemplary embodiment, the CPU 101 divides the capturing time range acquired in step S310 in unit times (10 minutes), and determines whether there is an image having a shooting time within each unit time. Then, the CPU 101 calculates a unit time period in which there is no image, and determines the unit time period to be a non-shooting time period.

That is, in the image list 800, the CPU 101 calculates time periods from Oct. 3, 2007 12:00 to Oct. 3, 2007 12:10, from Oct. 3, 2007 12:30 to Oct. 3, 2007 12:50, and from Oct. 3, 2007 13:00 to Oct. 3, 2007 13:40, as non-shooting time periods.

In step S313 of the present exemplary embodiment, a priority of model names is used as the third condition instead of a keyboard. When there is a plurality of images having different model names in the same time period, the CPU 101 determines an image with a model name having the highest priority as a capturing target image, based on the priority of the model names acquired in step S310.

In the present exemplary embodiment, in the time period from Oct. 3, 2007 13:00 to 13:10, there are the 0003.jpg and 0004.jpg of the B model in the image list 801 and 0001.jpg of the C model in the image list 802. If a priority of the B model is higher than a priority of the C mode, the CPU 101 determines that the 0003.jpg and 0004.jpg in the image list 801 are determined as a capturing target image.

Accordingly, in the present exemplary embodiment, the CPU 101 determines that the image data 0002.jpg, 0003.jpg and 0004.jpg in the image list 801, and the image data 0002.jpg and 0003.jpg in the image list 802 are determined as a capturing target image.

Figure 10:
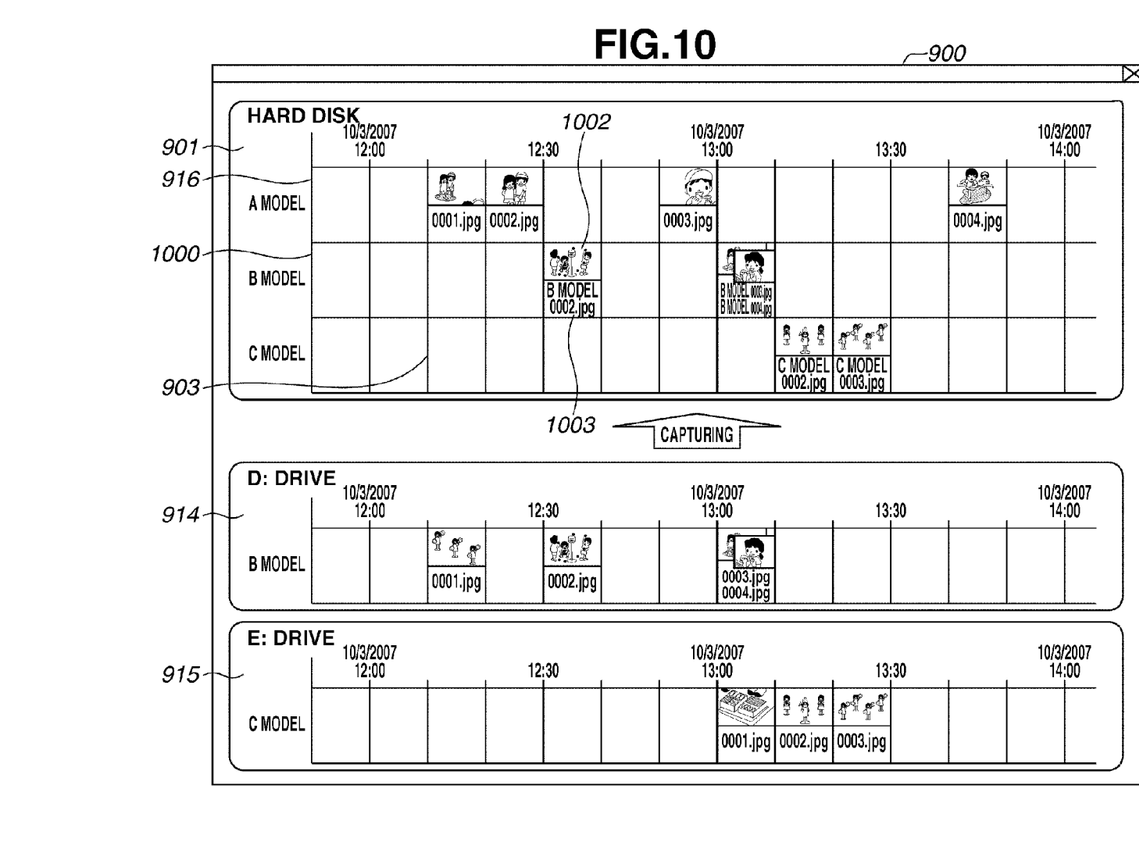
FIG. 10 illustrates an example of an image capturing window after capturing images of an image management apparatus according to an exemplary embodiment of the present invention.

In step S318 of the present exemplary embodiment, based on the image list 800 updated in step S317, the CPU 101 updates a content of the display of the image capturing window 900, as illustrated in FIG. 10. In the image capturing window 900 in FIG. 10, a thumbnail image 1002 and a file name 1003 of the image acquired in step S316 is added to and displayed on the display area 1000 corresponding to each model name.

According to the present exemplary embodiment, a user set a priority of model names, and if there are a plurality of images having different model names in the same time period, the CPU 101 extracts image data of a model name having a high priority. Therefore, the user can easily acquire similar images shot by a plurality of image shooting apparatuses without overlapping the images.

In the exemplary embodiment described above, the CPU 101 calculates a non-shooting time period for each model name of a image shooting apparatus. However, the CPU 101 can use other identification information instead of the model name.

As for the other identification information, identification information of a recording medium, storage position information such as a file path and a folder of an image, owner information of an image shooting apparatus, and arbitrary identification information previously assigned by a user can be used.

For example, when a user uses the identification information of a recording medium, the CPU 101 acquires images of other recording medium. When a user uses the storage position information, the CPU 101 acquires images stored in other folder. When a user uses the owner information, the CPU 101 acquires images of other owner information. When a user uses the arbitrary identification information previously assigned by a user, the CPU 101 acquires images having different identification information.

In a third exemplary embodiment, an image management system, in which a client apparatus of a user downloads an image shot in a non-shooting time from a server apparatus on a network, is described.

The client apparatus and the server apparatus of the present exemplary embodiment are implemented by a computer apparatus having a configuration similar to the configuration of the personal computer illustrated in FIG. 1. Operations of the client apparatus and the server apparatus will be described with reference to flowcharts in FIG. 12.

Figure 12:
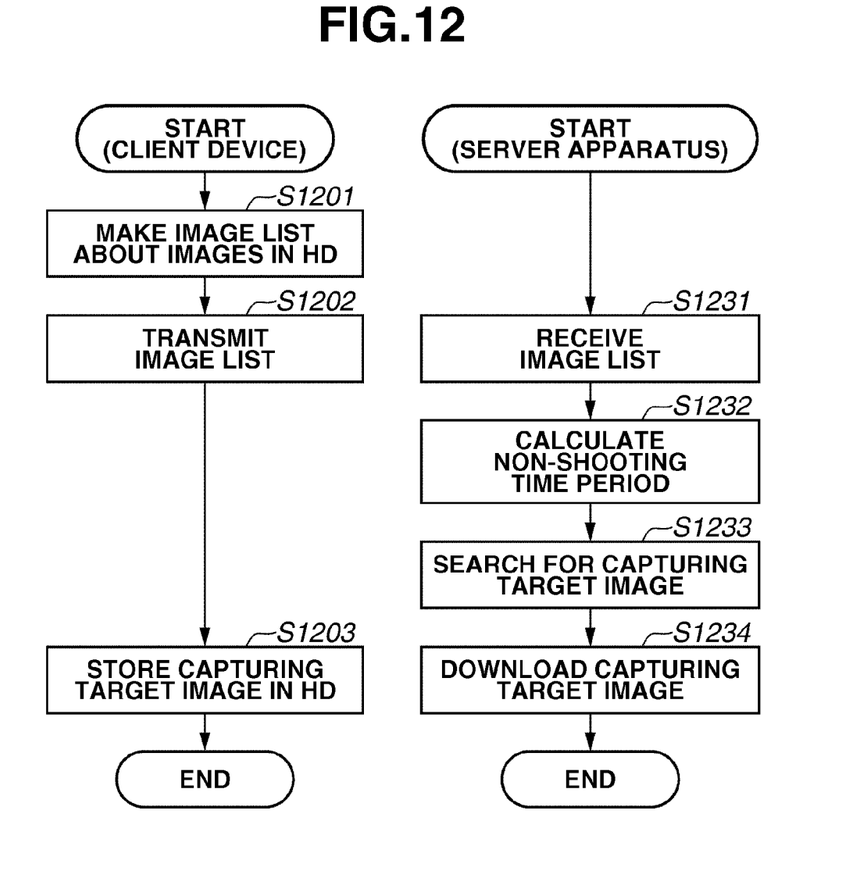
FIG. 12 is flowcharts illustrating an example of an operation of a client device and a server apparatus respectively.

The CPU 101 of the client apparatus executes following operations by reading an operating system (OS), a web browser, and an image management program from the HD 102, and starting operations. Further, the CPU 101 of the server apparatus executes the following operations by reading an OS, a web browser, and an application program from the HD 102 and stores them.

In step S1201, the CPU 101 of the client apparatus refers image files stored in the HD 102 and creates the image list 400. In step S1202, the CPU 101 of the client apparatus accesses a web site of the server apparatus, and transmits the image list 400.

In step S1231, the CPU 101 of the server apparatus receives the image list 400. In step S1232, the CPU 101 of the server apparatus calculates a non-shooting time period by a process similar to the first and the second exemplary embodiments, based on the image list 400.

The HD 102 in the server apparatus previously stores image files uploaded from a plurality of client apparatuses. The HD 102 also stores the image files in which file names, model names, shooting dates and times, keywords, and shooting positions are related.

In step S1233, the CPU 101 of the server apparatus searches for an image file having similar conditions as the conditions of the first or the second exemplary embodiments among image files stored in the HD 102 in the server apparatus. In step S1234, the CPU 101 of the server apparatus downloads the searched image file to the client apparatus. In step S1203, the CPU 101 of the client apparatus stores the downloaded image file in the HD 102.

According to the present exemplary embodiment, a user can easily acquire an image in a time period, in which the user could not shoot, among mass images shot by many other users.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-063418 filed Mar. 16, 2009 and No. 2010-007197 filed Jan. 15, 2010, which are hereby incorporated by reference herein in their entirety.

What is claimed is:

1. An image management apparatus for managing an image related to identification information for identifying an image shooting apparatus which shoots the image, the image management apparatus comprising:
   a sorting unit that sorts a plurality of images captured by a first image shooting apparatus based on shooting times of the plurality of images;
   a calculation unit that calculates a time interval between shooting times of two images which are adjacent in the sorted order, among the plurality of images it;
   a determination unit that determines a non-shooting time period, in which the calculated time interval is longer than a predetermined time interval; and
   an acquisition unit that acquires an image having a shooting time included in the determined non-shooting time period from a plurality of images related to a second image shooting apparatus,
   wherein the first shooting apparatus is different from the second shooting apparatus, and
   wherein the image management apparatus comprises a processor executing a program stored in a memory to implement at least a part of function of at least one of the units.

2. The image management apparatus according to claim 1, wherein the acquisition unit acquires the image from a second storing medium different from a first storing medium storing the images to be sorted by the sorting unit.

3. The image management apparatus according to claim 1, wherein the acquisition unit acquires the image having further at least one of a predetermined object, a predetermined keyword, and a predetermined shooting place.

4. The image management apparatus according to claim 1, further comprising:
   a setting unit that sets a priority to a plurality of the second shooting apparatuses,
   wherein when there are a plurality of images having the shooting time included in the determined non-shooting time period, the acquisition unit acquires the image to which a highest priority is set.

5. The image management apparatus according to claim 1, wherein the acquisition unit acquires a moving image having a shooting time of at least a part of the moving image, included in the non-shooting time period.

6. A method for controlling an image management apparatus for managing an image related to identification information for identifying an image shooting apparatus which shoots the image, the image management unit including a sorting unit, a calculation unit, a determination unit and an acquisition unit, the method comprising:
   via the sorting unit, sorting a plurality of images captured by a first image shooting apparatus based on shooting times of the plurality of images;
   via the calculation unit, calculating a time interval between shooting times of two images which are adjacent in the sorted order, among the plurality of images;
   via the determination unit, determining a non-shooting time period, in which the calculated time interval is longer than a predetermined time interval; and
   via the acquisition unit, acquiring an image having a shooting time included in the determined non-shooting period from a plurality of images related to a second image shooting apparatus,
   wherein the first shooting apparatus is different from the second shooting apparatus, and
   wherein the image management apparatus comprises a processor for executing a program stored in a memory to implement at least a part of function of at least one of the units.

7. The method according to claim 6, wherein the acquisition unit acquires a moving image having a shooting time of at least a part of the moving image image, included in the non-shooting time period.

8. A non-transitory computer-readable storage medium containing computer-executable instructions for controlling an image management apparatus for managing an image related to identification information for identifying an image shooting apparatus which shoots the image, the image management unit including a sorting unit, a calculation unit, a determination unit and an acquisition unit, the medium comprising:
   computer-executable instructions that, via the sorting unit, sort a plurality of images captured by a first image shooting apparatus based on shooting times of the plurality of images;
   computer-executable instructions that, via the calculation unit, calculates a time interval between shooting times of two images which are adjacent in the sorted order, among the plurality of images;
   computer-executable instructions that, via the determination unit, determine a non-shooting time period, in which the calculated time interval is longer than a predetermined time interval; and
   computer-executable instructions that, via the acquisition unit, acquires an image having a shooting time included in the determined non-shooting period from a plurality of images related to a second image shooting apparatus,
   wherein the first shooting apparatus is different from the second shooting, and
   wherein the image management apparatus comprises a processor executing a program stored in a memory to implement at least a part of function of at least one of the units.

9. The method according to claim 6, wherein the acquisition unit acquires the image from a second storing medium different from a first storing medium storing the images to be sorted by the sorting unit.

10. The method according to claim 6, wherein the acquisition unit acquires the image having further at least one of a predetermined object, a predetermined keyword, and a predetermined shooting place.

11. The method according to claim 6, further comprising:
    via a setting unit, setting a priority to a plurality of the second shooting apparatuses,
    wherein when there are a plurality of images having the shooting time included in the determined non-shooting time period, the acquisition unit acquires the image to which a highest priority is set.

* * * * *